US007476344B2

(12) United States Patent
Sunkara et al.

(10) Patent No.: US 7,476,344 B2
(45) **Date of Patent: *Jan. 13, 2009**

(54) ELECTRICAL APPARATUSES CONTAINING POLYTRIMETHYLENE HOMO- OR COPOLYETHER GLYCOL BASED ELECTRICAL INSULATION FLUIDS

(75) Inventors: Hari Babu Sunkara, Hockessin, DE (US); Ray W. Miller, Kennett Square, PA (US); Joseph V. Kurian, Hockessin, DE (US)

(73) Assignee: E.I. Du Pont de Nemours, Wilimington, DE (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/065,799

(22) Filed: Feb. 25, 2005

(65) Prior Publication Data

US 2006/0192185 A1 Aug. 31, 2006

(51) Int. Cl.
*C09K 5/00* (2006.01)

(52) U.S. Cl. ...................................... 252/570; 528/272

(58) Field of Classification Search ....................... None
See application file for complete search history.

(56) References Cited

U.S. PATENT DOCUMENTS

| | | | |
|---|---|---|---|
| 2,491,432 | A | 12/1949 | White |
| 2,520,733 | A | 8/1950 | Morris et al. |
| 2,599,803 | A | 6/1952 | Ballard |
| 2,717,242 | A | 9/1955 | Foehr |
| 3,326,985 | A | 6/1967 | Mason |
| 3,541,031 | A | 11/1970 | Boudreau |
| 3,833,512 | A | 9/1974 | Prokai et al. |
| 4,388,669 | A | 6/1983 | Cichanowski |
| 5,719,251 | A | 2/1998 | Wilczek et al. |
| 6,080,816 | A | 6/2000 | Gregorovich et al. |
| 6,268,456 | B1 | 7/2001 | Gregorovich et al. |
| 6,329,489 | B1 | 12/2001 | Gregorovich et al. |
| 6,562,457 | B1 | 5/2003 | Goldfinger et al. |
| 6,590,065 | B1 | 7/2003 | Goldfinger |
| 6,599,625 | B2 | 7/2003 | Goldfinger et al. |
| 6,608,168 | B1 | 8/2003 | Ng |
| 6,720,459 | B2 | 4/2004 | Sunkara et al. |
| 6,737,482 | B1 | 5/2004 | Ando et al. |
| 6,852,823 | B2 | 2/2005 | Sunkara et al. |
| 2002/0007043 | A1 | 1/2002 | Sunkara et al. |
| 2002/0010374 | A1 | 1/2002 | Sunkara et al. |
| 2003/0047708 | A1 | 3/2003 | Eaton et al. |
| 2003/0052302 | A1 | 3/2003 | Eaton et al. |
| 2004/0030089 | A1 | 2/2004 | Sunkara |
| 2004/0030095 | A1 | 2/2004 | Sunkara et al. |
| 2004/0077823 | A1 | 4/2004 | Sunkara et al. |
| 2004/0127673 | A1 | 7/2004 | Sunkara |
| 2004/0132951 | A1 | 7/2004 | Burkhart et al. |
| 2004/0225107 | A1 | 11/2004 | Sunkara et al. |
| 2004/0225161 | A1 | 11/2004 | Sunkara et al. |
| 2004/0225162 | A1 | 11/2004 | Sunkara et al. |
| 2004/0225163 | A1 | 11/2004 | Sunkara et al. |
| 2004/0249061 | A1 | 12/2004 | Sunkara et al. |
| 2004/0258923 | A1 | 12/2004 | Sormani et al. |
| 2005/0014661 | A1 * | 1/2005 | Sunkara ...................... 508/579 |
| 2005/0020805 | A1 | 1/2005 | Sunkara et al. |

FOREIGN PATENT DOCUMENTS

| | | |
|---|---|---|
| JP | 06329739 | 2/1995 |
| WO | WO 02/10298 A1 | 2/2002 |

OTHER PUBLICATIONS

Eaton, Boon, Smith; "A Chemical Base for Engine Coolant/Antifreeze with Improved Thermal Stability Properties"; Engine Coolant Technology (SP-1612); SAE Technical Paper Series 2001-01-1182; SAE 2001 World Congress; Mar. 5-8, 2001.

Wu, Sears, Soucek, Simonsick; "Synthesis of Reactive Diluents for Cationic Cycloaliphatic Epoxide UV Coatings"; Polymer 40 (1999), pp. 5675-5686.

Wu, Sears & Soucek; "Siloxane Modified Cycloaliphatic Epoxide UV Coatings"; Progress in Organic Coatings 36 (1999), pp. 89-101.

* cited by examiner

*Primary Examiner*—Necholus Ogden, Jr.
(74) *Attorney, Agent, or Firm*—Gail D. Tanzer

(57) ABSTRACT

Electrical apparatuses and a method for their production, the apparatuses containing electrical insulation fluids comprising polytrimethylene homo- or copolyether glycol having a dielectric breakdown voltage greater than about 30 kV, wherein from about 50 to 100 mole percent of the repeating units of the polytrimethylene homo- or copolyether glycol are trimethylene ether units. An electrical insulation fluid comprising (a) polytrimethylene homo- or copolyether glycol having trimethylene ether units at about 50 to 100 mole percent of the repeating units and (b) a blending component selected from the group consisting of vegetable oils, mineral oil, poly alpha olefins, synthetic esters, and silicone fluids, and mixtures thereof, wherein the electrical insulation fluid has a dielectric breakdown voltage of greater than about 30 kV.

13 Claims, No Drawings

ELECTRICAL APPARATUSES CONTAINING POLYTRIMETHYLENE HOMO- OR COPOLYETHER GLYCOL BASED ELECTRICAL INSULATION FLUIDS

FIELD OF THE INVENTION

This invention relates to electrical apparatuses containing electrical insulation fluids comprising polytrimethylene homo- or copolyether glycol.

BACKGROUND OF THE INVENTION

The components that are used to generate and transfer electrical energy to end users are well known in the art. Electrical power producers generally generate electrical power at very high initial voltages. Handling of such high voltages requires substantial electrical insulation. The insulation requires control of heat that is generated from the transmission of the electrical energy and maintenance of its dielectric properties.

The primary purpose of the types of fluids needed for electrical transformers and fluid-filled transmission lines, hereinafter referred to as electrical insulating fluid, is to maintain cooling properties and fluid characteristics while in use within the system so as to maintain appropriate temperature as well as dielectric strength on demand. The heat of the transformer unit, for example, can increase to high levels for extended periods of time which the fluid must be able to tolerate without losing its properties. Additionally, the operation of transformers and the process of heat dissipation at various ambient temperatures subjects the fluid to constant stresses.

It has been found that certain fluids have high electrical insulating and heat dissipation properties. These fluids are used with such electrical components as transformers and fluid filled transmission lines. One particular problem, even with such fluids, is that over time and with substantial exposure to high voltage electricity, their beneficial characteristics, such as insulating and/or heat dissipation properties, degrade.

The industry uses a variety of insulating fluids which are easily available and cost effective. Examples are mineral oil, silicone fluid and synthetic hydrocarbon oils used in transformers, power cables and capacitors. Such fluids have certain properties that allow them to function satisfactorily. They must be electrically insulating and dissipate heat, and they must resist break-down. However, currently used fluids also have several deficiencies or concerns.

Many of the current fluids pose safety or contamination concerns. That is, they can be toxic to humans and animals. Many electrical components holding such fluids are situated near water or waterways where leakage or spills can cause serious damage to water and marine life. Leaks or spills on land can threaten ground water and contaminate soil.

Most of the current fluids are petroleum based and thus are derived from non-renewable starting materials. The amount of fluid of this type in use is significant. For example, one 15 MVA transformer (serving approximately 2000 customers, both residential and commercial) requires on the order of 3,600 gallons of electrically insulating fluid. One mile of fluid filled transmission cable (6 inch diameter) requires about 7,000 gallons. There are approximately 20,000 miles of high-pressure fluid filled transmission cables in the United States, most in larger cities and therefore near water or waterways.

Significant amounts of resources, both time and money, are spent by electrical power companies, in designing and implementing plans and systems to deter leaks or spills and to monitor transformers and transmission cables of these types for leaks or spills. It is estimated such costs are in the millions of dollars in the United States alone. Additionally, substantial resources are expended in reporting leaks or spills, even minor ones, because of environmental rules and regulations, at least with regard to petroleum based fluids. And, of course, the effect of leaks or spills can be very costly, as can remediation of the same.

Therefore, there have been attempts to look to new sources for such fluids. Such attempts need to address both the environmental concerns as well as the issue of renewability of source.

There are several fundamental properties that electrical insulation fluids require. These are:

1. High oxidation stability:
   a. long life and protection;
   b. no oxidation products;
   c. no changes in chemical properties.
2. Viscosity Characteristics:
   a. low pour point for cold temperature service, particularly in cold temperature regions; and
   b. high Viscosity Index for best viscosity under various operating temperatures.
3. Corrosion Inhibition Properties:
   a. inhibit contaminants in the fluid;
   b. inhibit water;
   c. inhibit oxidation by-products.
4. Seal, Polymer, Resin Compatibility:
   a. with old and new seal materials; and
   b. with resin and other insulating materials.

Another demand placed upon electrical insulation fluids is the requirement that they maintain a certain degree of stability in terms of insulating properties despite some of the physical and chemical changes that take place during extended use.

Therefore, it is a primary object of the present invention to provide electrical insulation fluids which improve over and/or solve at least a portion of the problems and deficiencies in the art.

SUMMARY OF THE INVENTION

This invention relates to an electrical apparatus comprising an electrical insulation fluid that comprises polytrimethylene homo- or copolyether glycol having a dielectric breakdown voltage greater than about 30 kV, wherein from about 50 to 100 mole percent of the repeating units of the polytrimethylene homo- or copolyether glycol are trimethylene ether units.

The invention also relates to a method of producing an electrical apparatus containing an electrical insulation fluid comprising: (a) selecting at least one electrical insulation fluid comprising polytrimethylene homo- or copolyether glycol having a dielectric breakdown voltage greater than about 30 kV, wherein from about 50 to 100 mole percent of the repeating units of the polytrimethylene homo- or copolyether glycol are trimethylene ether units, and (b) placing the fluid into the electrical apparatus.

The invention is further directed to an electrical insulation fluid comprising (a) polytrimethylene homo- or copolyether glycol having trimethylene ether units as about 50 to 100 mole percent of the repeating units and (b) blending component selected from the group consisting of vegetable oils, mineral oil, poly alpha olefins, silicone fluids, synthetic esters and mixtures thereof, wherein the electrical insulation fluid has a dielectric breakdown voltage of greater than about 30 kV.

Preferably, from about 75 to 100, more preferably from about 90 to 100, and most preferably from 99 to 100 mole percent of the repeating units of the polytrimethylene homo- or copolyether glycol are trimethylene ether units The electrical apparatus of the invention is preferably selected from the group consisting of electrical transformers, capacitors, fluid-filled transmission lines and fluid-filled power cables.

In a preferred embodiment of the invention the polytrimethylene homo- or copolyether glycol comprises homo- or copolyether selected from the group consisting of (a) polytrimethylene ether glycol, (b) poly(trimethylene-ethylene ether) glycol, (c) random polytrimethylene ether ester glycol, and (d) mixtures thereof. Preferably the polytrimethylene ether glycol has a number average molecular weight of from about 130 to about 1,500; the poly(trimethylene-ethylene ether) glycol has a number average molecular weight of from about 120 to about 1,500; and the random polytrimethylene ether ester glycol, which is preferably prepared by polycondensation of 1,3-propanediol and about 10 to about 0.1 mole percent of aliphatic or aromatic diacid or diester, has a number average molecular weight of from about 200 to about 1,500.

In a particularly preferred embodiment, polytrimethylene homo- or copolyether glycol is produced from ingredients comprising 1,3-propanediol derived from a fermentation process using a renewable biological source.

Preferably, the electrical insulation fluid has flash and fire points greater than about 200° C., a kinematic viscosity at 40° C. of from about 25 to about 500 centistokes, more preferably from about 50 to about 250 centistokes, and a thermal conductivity of from about 0.10 to about 0.21 watts/m° K at about 38° C.

Preferably, the electrical insulation fluid comprises from about 75 wt. % to 100 wt. % polytrimethylene homo- or copolyether ether glycol.

The electrical insulation fluid may further comprise a blending component. Preferably the blending component is selected from the group consisting of vegetable oil, mineral oil, silicone fluid, poly alpha olefins, synthetic esters and mixtures thereof.

In one preferred embodiment, the electrical insulation fluid comprises (a) from about 50 wt. % to about 99 wt. % polytrimethylene homo- or copolyether ether glycol, and (b) from about 1 to about 50 wt. % of the blending component, both by weight of the electrical insulation fluid.

The electrical insulation fluid may further comprise at least one additive selected from the group consisting of oxidation inhibitors, corrosion inhibitors, metal deactivators, and pour point depressants. Preferably the oxidation inhibitor comprises at least one compound selected from the group consisting of hindered phenols, phenolic esters, alkylated diphenylamines and mixtures thereof.

DETAILED DESCRIPTION OF THE INVENTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In one embodiment the invention is directed to an electrical apparatus comprising an electrical insulation fluid that comprises polytrimethylene homo- or copolyether glycol having a dielectric breakdown voltage greater than about 30 kV, wherein from about 50% to 100% of the repeating homo- or copolyether units of the polytrimethylene homo- or copolyether glycol are trimethylene ether units. Preferably from about 75% to 100%, more preferably from about 90% to 100%, and most preferably from about 99 to 100% of the repeating homo- or copolyether units of the polytrimethylene homo- or copolyether glycol are trimethylene ether units.

Polytrimethylene homo- or copolyether glycols are preferably prepared by polycondensation of monomers comprising 1,3-propanediol, thus resulting in polymers or copolymers containing $CH_2CH_2—CH_2—O$, or trimethylene ether repeating units. As indicated above, at least 50% of the repeating units are trimethylene ether units. Thus, minor amounts of other polyalkylene ether repeating units may be present also. Preferably these are derived from aliphatic diols other than 1,3-propanediol. Examples of typical aliphatic diols that may be used include those derived from aliphatic diols, for example ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol-, 2,2,3,3,4,4,5,5-octafluoro-1,6-hexanediol, and 3,3,4,4,5,5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide, A preferred group of aliphatic diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. The most preferred diol other than 1,3-propanediol is ethylene glycol.

The 1,3-propanediol employed for preparing the 1,3-propanediol based homo- or copolyether glycols may be obtained by any of the various well known chemical routes or by biochemical transformation routes. Most preferably, the 1,3-propanediol is obtained biochemically from a renewable source.

The most preferred source of 1,3-propanediol is a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in e.g., in the species *Klebsiella, Citrobacter, Clostridium*, and *Lactobacillus*. The technique is disclosed in several patents, including, U.S. Pat. Nos. 5,633,362, 5,686,276, and 5,821,092. In U.S. Pat. No. 5,821,092, Nagarajan et al. disclose, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer.

Preferably the 1,3-propanediol used as the reactant or as a component of the reactant will have a purity of greater than about 99% by weight as determined by gas chromatographic analysis.

In a preferred embodiment of the invention the electrical insulation fluids comprise at least one polytrimethylene homo- or copolyether ether glycol selected from the group consisting of (i) polytrimethylene ether glycol, (ii) poly(trimethylene-ethylene ether) glycol, (iii) random polytrimethylene ether ester glycol, and (iv) mixtures thereof.

Methods for preparation of the first of these, polytrimethylene ether glycol, by dehydration of 1,3-propanediol or by ring opening polymerization of oxetane are well known in the art.

U.S. Pat. No. 2,520,733, which is incorporated herein by reference, discloses polymers and copolymers of trimethylene glycol of molecular weight from about 100 to about 10,000 and a process for the preparation of these polymers from 1,3-propanediol in the presence of a dehydration catalyst such as iodine, inorganic acids (e.g. sulfuric acid) and organic acids.

U.S. Pat. No. 3,326,985, which is incorporated herein by reference, discloses a process for forming a polytrimethylene ether glycol having an average molecular weight of 1,200-1,400. First, polytrimethylene ether glycol which has an average molecular weight of about 900 is formed using hydriodic acid dehydration catalyst. This is followed by an after treatment which comprises vacuum stripping the polyglycol at a temperature in the range of 220-240° C. and at a pressure of 1-8 mm Hg in a current of nitrogen for from 1-6 hours.

U.S. Pat. No. 6,720,459, which is incorporated herein by reference, discloses a continuous process for preparation of polytrimethylene ether glycol from 1,3-propanediol using a polycondensation catalyst, preferably an acid catalyst. The process provides high purity polytrimethylene ether glycol having a number average molecular weight of at least about 1,000.

U.S. Patent Application Publication No. 2002/0007043, which is incorporated herein by reference, describes polytrimethylene ether glycol obtained from acid catalyzed polymerization of 1,3-propanediol reactant selected from the group consisting of 1,3-propanediol and/or its oligomers or prepolymers having a degree of polymerization of 2 to 9. The polymerization product is subjected to a purification process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. The process provides high purity polytrimethylene having a number average molecular weight of at least about 1,000.

Polytrimethylene ether glycol used for the electrical insulation fluid of the invention will preferably have a number average molecular weight of from about 130 (dimer) to about 1,500, more preferably from about 130 to about 1,000 and most preferably from about 130 to about 800. For molecular weights in this range the water washing step involved in purification may cause the loss of a significant amount of water sensitive oligomeric polytrimethylene ether glycol. For this reason a preferred method of preparation for material of these molecular weights avoids the hydrolysis step. Such a process is described in U.S. patent application Ser. No. 10/871,622, filed Jun. 18, 2004, which is incorporated herein by reference. The process consists of: (a) polycondensing 1,3-propanediol or its dimer or trimer in the presence of an acid polycondensation catalyst at a temperature of at least about 150° C. to obtain a polytrimethylene ether glycol reaction mixture; (b) adding to the reaction mixture substantially water-insoluble base to neutralize the acid polycondensation catalyst and obtain a neutralized reaction mixture, (c) contacting the neutralized reaction mixture with filter aid having a permeability no greater than about 0.150 Darcy, and (d) separating the polytrimethylene ether glycol from the filter aid, to obtain polytrimethylene ether glycol that is essentially free of end groups derived from the acid catalyst.

The second polytrimethylene homo- or copolyether glycol preferred for use in the invention is poly(trimethylene-ethylene ether) glycol. Materials of this type may be prepared by methods already described in the art, in particular as disclosed in U.S. Patent Application Publication No. 2004/0030095, which is incorporated herein by reference. As disclosed there, the poly(trimethylene-ethylene ether) glycol may be prepared by a process comprising the steps of: (a) providing 1,3-propanediol reactant, ethylene glycol reactant and acid polycondensation catalyst; and (b) polycondensing the reactants to form a poly(trimethylene-ethylene ether) glycol. It may also be prepared continuously or semi-continuously using the procedure of U.S. Patent Application Publication No. 2002/10374.

The poly(trimethylene-ethylene ether) glycols are preferably prepared using at least about 1 mole percent preferably at least about 2 mole percent and more preferably at least about 10 mole percent, and preferably up to about 50 mole percent, more preferably up to about 40 mole percent, and most preferably up to about 30 mole percent of ethylene glycol reactant based on the total amount of 1,3-propanediol and ethylene glycol reactants. The poly(trimethylene-ethylene ether) glycols are preferably prepared using up to about 99 mole percent preferably up to about 98 mole percent, and preferably at least about 50 mole percent, more preferably at least about 60 mole percent, and most preferably at least about 70 mole percent, of 1,3-propanediol based on the total amount of 1,3-propanediol and ethylene glycol reactants.

For use in the present invention the poly(trimethylene-ethylene ether) glycol will preferably have a number average molecular weight of from about 120 to about 1,500, more preferably from about 250 to about 1,000, and most preferably from about 250 to about 800.

The third preferred polytrimethylene homo- or copolyether ether glycol for use in the invention is random polytrimethylene ether ester glycol. A preferred method for preparation of the random polytrimethylene ether esters is presented in detail in U.S. Pat. No. 6,608,168, which is incorporated herein by reference. The esters are prepared by polycondensation of 1,3-propanediol reactant and about 10 to about 0.1 mole percent of aliphatic or aromatic diacid or diester, preferably diacid.

By "1,3-propanediol reactant" is meant 1,3-propanediol, and oligomers and prepolymers of 1,3-propanediol having a degree of polymerization of 2 to 20, preferably 2 to 9, and mixtures thereof. In addition, "oligomer" is used to refer to dimer and trimer of 1,3-propanediol; "prepolymer" is used to refer to 1,3-propanediol based compounds having a degree of polymerization of 4 to 20. The preferred starting material for the random polytrimethylene ether ester is 1,3-propanediol and, for simplicity, applicants will refer to 1,3-propanediol in describing the invention.

The aliphatic or aromatic diacids or diesters are preferably aromatic dicarboxylic acids or esters selected from the group of terephthalic acid, isophthalic acid, bibenzoic acid, naphthalic acid, bis(p-carboxyphenyl)methane, 1,5-naphthalene dicarboxylic acid, 2,7-naphthalene dicarboxylic acid, 4,4'-sulfonyl dibenzoic acid, p-(hydroxyethoxy)benzoic acid and esters thereof. Most preferred is terephthalic acid.

US 2005-0020805 A1, which is incorporated herein by reference, discloses a preferred way to prepare polytrimethylene ether glycols and esters.

Preferably the random polytrimethylene ether esters have a number average molecular weight of from about 200 to about 1,500, more preferably from about 200 to about 1,000.

Electrical insulation fluids generally perform two major functions. First, they serve as electrical insulation to withstand the high voltages present in a particular electrical apparatus in which they are used by being placed within the apparatus. Typical of the electrical apparatuses that use insulation fluids are electrical transformers, capacitors and fluid-filled transmission lines or power cables. Second, they function as heat transfer media to dissipate heat generated within the apparatus. Thus these fluids must maintain good electrical properties while at the same time resisting thermal oxidation and degradation.

Among the properties that are desirable for useful and efficient electrical insulation fluids are high dielectric breakdown voltage, low dissipation factor, high specific heat, high thermal conductivity, low coefficient of expansion, low viscosity, low sensitivity of viscosity to temperature, low pour point temperatures, low volatility and high flash point. The electrical insulation fluids of the invention possess a wide variety of these desirable properties.

For example, electrical insulation fluids of the invention will preferably have kinematic viscosities at 40° C. of from about 25 to about 500 centistokes, more preferably from about 50 to about 250 centistokes. They also preferably have thermal conductivities of from about 0.10 to about 0.21 watts/m° K at 38° C. (100° F.), and more preferably from about 0.125 to about 0.21 watts/m° K at 38° C.

Dielectric breakdown voltage is a measure of a fluid's ability to resist electrical breakdown at a power frequency of 60 Hz, and is measured as the minimum voltage required to cause arcing between two electrodes submerged in the fluid. It has been observed that the dielectric breakdown voltage of the electrical insulation fluids of the invention is greater than about 30 kV, the value that has been reported for mineral oil. The dielectric strength of insulating fluids is generally reduced if there is water present in the fluid. Surprisingly, however, the fluids of the invention have good dielectric strength in spite of high water levels of about 700-900 ppm. Generally it is preferred that the fluids of the invention contain less than about 1% and more preferably less than about 0.1% by weight of water.

Other significant properties possessed by the electrical insulation fluids of the invention are pour points preferably below about 20° C., flash and fire points preferably above about 200° C. and autoignition temperatures above about 300° C. Flash point assesses the overall flammability of the fluid and determines the presence of volatile or flammable material at elevated temperature; whereas the fire point determines the temperature at which the fluid would support combustion. This combination of properties ensures that the fluids of the invention can function satisfactorily as electrical insulation fluids at temperatures at least as low as about −50° C., and at least as high as about 300° C.

In preferred embodiments, the electrical insulation fluid will comprise from about 75 to 100 wt. %, more preferably from about 85 to about 100 wt. %, of the polytrimethylene homo- or copolyether glycols of the invention. The fluids may further comprise from about 1 wt. % to about 25 wt. %, preferably from about 5 wt. % to about 15 wt. %, of blending component comprising other insulating fluids such as vegetable oils, mineral oil, synthetic esters, silicon fluids and poly alpha olefins. Vegetable oils are the most preferred blending component. Examples of vegetable oils include but are not limited to sunflower oil, canola oil, rapeseed oil, corn oil, olive oil, soybean oil and castor oil. An example of a mineral oil which may be used as part of the present invention is RTEemp (Cooper Power Fluid Systems). Examples of synthetic esters include polyol esters. Commercially available synthetic esters which can be used as part of the invention include those sold under the trade names MIDEL 7131 (The Micanite and Insulators Co., Manchester UK), REOLEC 138 (FMC, Manchester, UK) and ENVIROTEMP 200 (Cooper Power Fluid Systems). Silicone fluids are available from Dow Corning under the trade name DOW CORNING SILICONES.

The electrical insulating fluids of the invention may comprise other useful additives. Exemplary of the most important types of additives are antioxidants, metal deactivators, in particular copper deactivators, corrosion inhibitors, and thermal stabilizers. Of lesser importance but sometimes desirable are viscosity modifiers, pour point depressants and anti foaming agents.

Stabilizers suitable for reducing the rate of thermal and oxidative degradation of the 1,3-propanediol based homo- or copolyethers include phenolic compounds such as 2,2-di(4-hydroxyphenyl)propane, phenothiazine, 3,7-dioctyl phenothiazine, phenothiazine carboxylic acid esters, phenothiazines such as N-ethyl phenothiazine, N-phenyl phenothiazine, etc.; polymerized trimethyldihydroquinoline; amines, such as phenyl-α-naphthylamine, phenyl-β-naphthylamine, N,N'-dioctyldiphenylamine, N,N'-diphenyl-p-phenylene diamine, N,N'-di-β-naphthyl-p-phenylene diamine, p-isopropoxy diphenylamine, N,N'-dibutyl p-phenylene diamine, N,N'-bis (1,4-dimethylpentyl)-p-phenylenediamine, N,N'-diisopropyl-p-phenylenediamine, p-hydroxydiphenylamine, etc.; hindered phenols such as dibutyl cresol, 2,6-dimethyl-p-cresol, butylated 2,2-di-(4-hydroxyphenyl)propane, N-butylated aminophenol, etc.; butylated hydroxyanisoles, such as 2,6-dibutyl-p-hydroxyanisole, anthraquinone, dihydroxyanthraquinone, hydroquinone, 2,5-di-t-butylhydroquinone, 2-t-butylhydroquinone; quinoline; p-hydroxydiphenylamine, phenylbenzoate, p-hydroxyanisole, nordihydroguairetic acid; pyrocatechol; styrenated phenol; polyalkyl polyphenols; propyl gallate; sodium nitrite, etc. Mixtures of the above mentioned stabilizers may be employed if desired. Stabilizers which provide fluid with no more than trace amounts of varnishes and/or sludges as degradation products after 500 hours of continuous use at temperatures of about 260° C. preferably 290° C., are particularly desirable. Stabilizers selected from the group consisting of N,N'-diphenyl-p-phenylenediamine, phenothiazine, propyl gallate and 3,7-dioctylphenothiazine are particularly well suited for use herein. Stabilizer combinations of phenothiazine or 3,7-dioctylphenothiazine and at least one other antioxidant, preferably N,N'-diphenyl-p-phenylenediamine, are preferred.

Typically, oxidation/thermal stabilizers are used in the fluids of this invention in an amount of from about 0.1 wt. % to about 10 wt. %, based upon the weight of the fluid, and more preferably in an amount of from about 0.5 wt. % to about 5 wt. %. It is desirable for the stabilizer to have a solubility of at least 25 g/liter of the composition at 25° C. The oxidative stability of polytrimethylene ether glycol in the presence of 1% of phenothiazine when tested according to ASTM D-2272, was excellent.

Additives for corrosion control include steel corrosion inhibitors such as phosphate esters, dimer acid, alkyl succinic anhydride and the like, and copper corrosion inhibitors such as benzotriazole, tolyltriazole, mercaptobenzothiazole and the like. Borates, chromates, molybdates and tungstates have also been found to be useful. Anti-corrosion additives are preferably used in an amount of from about 0.05 wt. % to about 5 wt. %, and more preferably from about 0.05 wt. % to about 3% wt. % based on the weight of the electrical insulation fluid.

Since copper is almost always present in the electrical environment, another type of additive often used is copper deactivators. Copper deactivators such as benzotriazole derivatives are commercially available. The use of these deactivators in small amounts, such as below 1%, may be beneficial in reducing the catalytic activity of copper in electrical apparatus.

In addition to the additives listed above, the electrical insulation fluids of the invention can contain other additives, such as acid-base indicators and dyes, provided that the additives are soluble in the compositions, are thermally stable at high temperatures and do not deleteriously affect the electrical properties.

The invention is illustrated in the following examples. All parts, percentages, etc., referred to in this application (including the examples) are by weight unless otherwise indicated.

EXAMPLES

The 1,3-propanediol utilized in the examples was prepared by biological methods and had a purity of >99.8%.

The number-average molecular weights (Mn) of the polymer were determined by end-group analysis using NMR spectroscopic methods.

The oxidative stability of polytrimethylene ether glycol containing an antioxidant was evaluated according to ASTM D-2272 in the presence of water and copper at 150° C. using an oxygen-pressured bomb. ASTM D-2272 is a modified method and uses higher temperature than ASTM-D 2112.

Example 1

This example illustrates preparation of polytrimethylene ether glycol.

To a 5 L four-neck round bottom flask were charged 3040 g (40 moles) of 1,3-propanediol (PDO) and 15.22 g (0.155 moles, 0.5% of the PDO weight) of sulfuric acid. The reaction mixture was degassed for 10 minutes under nitrogen and then heated at 170° C. for 3 hours, followed by heating at 180° C. for 4.5 hours while being stirred at 150 rpm under a nitrogen flow rate of 0.08 L/min. The reaction by-product, which was largely water, was collected continuously during polymerization. The reaction was stopped after 673 mL of water had been collected. The crude polymer was neutralized with an aqueous slurry containing 11.5 g of calcium hydroxide and 23.7 g of deionized water at 70° C. for 2 hours. The neutralized reaction mixture was dried at 100° C. for about 3 hours under reduced pressure to remove water. The dried polymer was filtered using a 4 L glass filtration unit equipped with a steam circulating outer layer. A No. 1 WHATMAN filter paper with 15 cm diameter was placed in the filtration unit and 32.2 g of CELPURE-65 (permeability in the range of 0.040 to 0.080 Darcy and surface area in the range of 6-7 $m^2/g$) was spread uniformly onto the filter paper. Volatiles, such as unreacted 1,3-propanediol, were separated by passing the entire polymer mixture (2.04 kg) through a short path distillation apparatus under 400 mTorr pressure at 120° C. The low boiling fraction collected was 118 g. The resulting purified polymer had a number average molecular weight of 510 with a polydispersity of 1.426, and a color of 21 APHA. The unsaturation in the polymer was 13 meq/kg.

The polymer was evaluated for its electrical, thermal, fluid and ignition characteristics. The results are presented in Table 1 below.

Example 2

Poly(trimethylene ethylene ether) glycol was prepared from the polycondensation of 1,3-propanediol and ethylene glycol reactants as described in US2004/0030095A1, and the polymer had a number average molecular weight of 1,130. The properties of this copolyether are reported in Table 1.

Example 3

This example describes blending polytrimethylene ether glycol with a vegetable oil to produce an electrical insulation fluid.

A clear and homogeneous fluid was obtained by adding 10 g of caster oil to 80.0 g polytrimethylene ether glycol having a number average molecular weight of 800, followed by stirring the resulting mixture at room temperature for 10 minutes.

TABLE 1

Properties of Polytrimethylene Homo- or Copolyether Glycols.

| Performance Property | Test Method | Mineral Oil[a] | Example 1 | Example 2 |
|---|---|---|---|---|
| Electrical | | | | |
| Dielectric Breakdown Voltage, kV | ASTM D-877 | 30 | 36 | 31 |
| Dielectric Constant, 1000 Hz @ room temp. | ASTM D-150 | | 8.44 | 7.33 |
| Dissipation Factor, 1000 Hz @ room temp. | ASTM D-150 | | 0.196 | 0.220 |
| Thermal | | | | |
| Specific heat, cal/g ° C. | ASTM E-1269 | | | |
| @ 38° C. (100° F.) | | 0.43 | 0.504 | 0.526 |
| @ 93° C. (200° F.) | DSC | | 0.570 | 0.571 |
| Thermal conductivity, watts/m ° K | | | | |
| @ 38° C. (100° F.) | | | 0.171 | 0.174 |
| @ 93° C. (200° F.) | | | 0.169 | 0.162 |

TABLE 1-continued

Properties of Polytrimethylene Homo- or Copolyether Glycols.

| Performance Property | Test Method | Mineral Oil[a] | Example 1 | Example 2 |
|---|---|---|---|---|
| Coefficient of Expansion, cc/cc/° C. | | | | |
| @ 40° C. | | $7.55 \times 10^{-4}$ | $5.82 \times 10^{-4}$ | $8.68 \times 10^{-4}$ |
| Other | | | | |
| Density @ 40° C., g/cc | | 0.91 | 1.0205 | 1.031 |
| Viscosity, cSt | | | | |
| @ 40° C. | | 12 | 97 | 176 |
| @ 100° C. | | 3 | 14.9 | 28 |
| Alkalinity, meq OH/30 kg polymer | | | −0.9 | — |
| Pour Point, ° C. | ASTM D-97 | −40 | −24 | −41 |
| Flash Point, ° C. | ASTM D-92 | 145 | 235 | 257 |
| Fire Point, ° C. | ASTM D-92 | 160 | 257 | 276 |
| Autoignition Temperature, ° C. | ASTM D-2155 | | 366 | 379 |
| Moisture content, ppm | | | 720-880 | |
| Oxidative stability, | | | | |
| Rotating Bomb test @ 150° C., min | ASTM D-2272 | | | |
| 1 wt % phenylnapthylamine | | | 310 | |
| 1 wt % phenothiazine | | | 415 | |

[a]Literature values

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. An electrical apparatus comprising an electrical insulation fluid comprising polytrimethylene ether glycol homopolymer having a dielectric breakdown voltage greater than about 30 kV, wherein the repeating units of the polytrimethylene ether glycol homopolymer are trimethylene ether units.

2. The electrical apparatus of claim 1 wherein the polytrimethylene ether glycol homopolymer has a number average molecular weight of from about 130 to about 1,500.

3. The electrical apparatus of claim 1 wherein the electrical insulation fluid further comprises a blending component selected from the group consisting of vegetable oil, mineral oil, silicone fluids, synthetic esters and poly alpha olefins.

4. The electrical apparatus of claim 3 wherein the electrical insulation fluid comprises from about 50 wt. % to about 99 wt. % polytrimethylene ether glycol homopolymer and about 1 wt. % to about 50 wt. % of the blending component, based on the weight of the electrical insulating fluid.

5. The electrical apparatus of claim 1 wherein the electrical insulation fluid comprises from about 75 wt. % to 100 wt. % polytrimethylene ether glycol homopolymer.

6. The electrical apparatus of claim 1 wherein the electrical insulation fluid has flash and fire points greater than about 200° C.

7. The electrical apparatus of claim 1 wherein the electrical insulation fluid has a kinematic viscosity at 40° C. of from about 25 to about 500 centistokes.

8. The electrical apparatus of claim 1 wherein the electrical insulation fluid has a kinematic viscosity at 40° C. of from about 50 to about 250 centistokes.

9. The electrical apparatus of claim 1 wherein the electrical insulation fluid has a thermal conductivity of from about 0.10 to about 0.21 watts/m° K at 38° C.

10. The electrical apparatus of claim 1 wherein the polytrimethylene ether glycol homopolymer is produced from ingredients comprising 1,3-propanediol derived from a fermentation process using a renewable biological source.

11. The electrical apparatus of claim 1 wherein the electrical insulation fluid further comprises at least one additive selected from the group consisting of oxidation inhibitors, corrosion inhibitors, metal deactivators, and pour point depressants.

12. The electrical apparatus of claim 11 wherein the oxidation inhibitor comprises at least one compound selected from the group consisting of hindered phenols, phenolic esters, alkylated diphenylamines and mixtures thereof.

13. The electrical apparatus of claim 1 selected from the group consisting of electrical transformers, capacitors, fluid-filled transmission lines and fluid-filled power cables.

* * * * *